(12) United States Patent
Girase et al.

(10) Patent No.: US 12,258,047 B2
(45) Date of Patent: Mar. 25, 2025

(54) SYSTEM AND METHOD FOR PROVIDING LONG TERM AND KEY INTENTIONS FOR TRAJECTORY PREDICTION

(71) Applicant: Honda Motor Co., Ltd., Tokyo (JP)

(72) Inventors: Harshayu Girase, Union City, CA (US); Haiming Gang, San Jose, CA (US); Srikanth Malla, Sunnyvale, CA (US); Jiachen Li, Albany, CA (US); Akira Kanehara, Utsunomiya (JP); Chiho Choi, San Jose, CA (US)

(73) Assignee: Honda Motor Co., Ltd., Tokyo (JP)

(*) Notice: Subject to any disclaimer, the term of this patent is extended or adjusted under 35 U.S.C. 154(b) by 502 days.

(21) Appl. No.: 17/352,540

(22) Filed: Jun. 21, 2021

(65) Prior Publication Data

US 2022/0306160 A1   Sep. 29, 2022

Related U.S. Application Data

(60) Provisional application No. 63/166,195, filed on Mar. 25, 2021.

(51) Int. Cl.
*B60W 60/00* (2020.01)
*G01S 17/86* (2020.01)
(Continued)

(52) U.S. Cl.
CPC ......... *B60W 60/0027* (2020.02); *G01S 17/86* (2020.01); *G01S 17/894* (2020.01);
(Continued)

(58) Field of Classification Search
CPC ......... B60W 60/0027; B60W 2420/42; B60W 2420/52; B60W 2554/4029;
(Continued)

(56) References Cited

U.S. PATENT DOCUMENTS 11,640,174 B2* 5/2023 Tran ............... B60R 11/04 701/25
2019/0382007 A1* 12/2019 Casas ............. G06V 10/764
(Continued)

FOREIGN PATENT DOCUMENTS

CN   110895674   3/2020

OTHER PUBLICATIONS

Alexandre Alahi, Kratarth Goel, Vignesh Ramanathan, Alexandre Robicquet, Li Fei-Fei, and Silvio Savarese. Social lstm: Human trajectory prediction in crowded spaces. In Proceedings of the IEEE conference on computer vision and pattern recognition, pp. 961-971, 2016.
(Continued)

*Primary Examiner* — Ig T An
*Assistant Examiner* — Christine Nguyen Huynh
(74) *Attorney, Agent, or Firm* — Rankin, Hill & Clark LLP

(57) ABSTRACT

A system and method for providing long term and key intentions for trajectory prediction that include receiving image data and LiDAR data associated with RGB images and LiDAR point clouds that are associated with a surrounding environment of an ego agent and processing a long term and key intentions for trajectory prediction dataset (LOKI dataset) that is utilized to complete joint trajectory and intention prediction for heterogeneous traffic agents. The system and method also include encoding a past observation history of each of the heterogeneous traffic agents and sampling a respective goal. The system and method further include decoding and predicting future trajectories associated with each of the heterogeneous traffic agents based on data included within the LOKI dataset, the encoded past observation history, and the respective goal.

18 Claims, 5 Drawing Sheets

(51) Int. Cl.
   *G01S 17/894* (2020.01)
   *G06T 7/20* (2017.01)
(52) U.S. Cl.
   CPC ......... *G06T 7/20* (2013.01); *B60W 2420/403* (2013.01); *B60W 2420/408* (2024.01); *B60W 2554/4029* (2020.02); *B60W 2554/4045* (2020.02); *B60W 2556/10* (2020.02); *G06T 2207/10024* (2013.01); *G06T 2207/10028* (2013.01); *G06T 2207/20072* (2013.01); *G06T 2207/30196* (2013.01); *G06T 2207/30236* (2013.01); *G06T 2207/30241* (2013.01); *G06T 2207/30252* (2013.01)
(58) Field of Classification Search
   CPC ....... B60W 2554/4045; B60W 2556/10; G01S 17/86; G01S 17/894; G01S 7/4808; G01S 17/89; G01S 17/931; G06T 7/20; G06T 2207/10024; G06T 2207/10028; G06T 2207/20072; G06T 2207/30196; G06T 2207/30236; G06T 2207/30241; G06T 2207/30252; G01C 21/20
   See application file for complete search history.

(56) References Cited

U.S. PATENT DOCUMENTS

| | | | |
|---|---|---|---|
| 2020/0039520 A1 | 2/2020 | Misu et al. | |
| 2020/0039521 A1 | 2/2020 | Misu et al. | |
| 2020/0264609 A1* | 8/2020 | Hammond | G05D 1/0246 |
| 2020/0401135 A1 | 12/2020 | Chen et al. | |
| 2021/0146949 A1* | 5/2021 | Martinez Covarrubias | G06N 20/00 |
| 2021/0347377 A1* | 11/2021 | Siebert | G05D 1/0274 |

OTHER PUBLICATIONS

Alexandre Alahi, Vignesh Ramanathan, and Li Fei-Fei. Socially-aware large-scale crowd forecasting. In Proceedings of the IEEE Conference on Computer Vision and Pattern Recognition, pp. 2203-2210, 2014.
Holger Caesar, Varun Bankiti, Alex H Lang, Sourabh Vora, Venice Erin Liong, Qiang Xu, Anush Krishnan, Yu Pan, Giancarlo Baldan, and Oscar Beijbom. nuscenes: A multimodal dataset for autonomous driving. In Proceedings of the IEEE/CVF conference on computer vision and pattern recognition, pp. 11621-11631, 2020.
Susan Carey and Elizabeth Spelke. Domain-specific knowledge and conceptual change. Mapping the mind: Domain specificity in cognition and culture, 169:200, 1994.
Sergio Casas, Wenjie Luo, and Raquel Urtasun. Intentnet: Learning to predict intention from raw sensor data. In Conference on Robot Learning, pp. 947-956. PMLR, 2018.
Ming-Fang Chang, John Lambert, Patsorn Sangkloy, Jagjeet Singh, Slawomir Bak, Andrew Hartnett, DeWang, Peter Carr, Simon Lucey, Deva Ramanan, et al. Argoverse: 3d tracking and forecasting with rich maps. In Proceedings of the IEEE/CVF Conference on Computer Vision and Pattern Recognition, pp. 8748-8757, 2019.
Chiho Choi, Srikanth Malla, Abhishek Patil, and Joon Hee Choi. Drogon: A trajectory prediction model based on Intention-conditioned behavior reasoning. In Proceedings of the Conference on Robot Learning, 2020.
Patrick Dendorfer, Aljosa Osep, and Laura Leal-Taixe. Goalgan: Multimodal trajectory prediction based on goal position estimation. In Proceedings of the Asian Conference on Computer Vision, 2020.
Nachiket Deo and Mohan M Trivedi. Trajectory forecasts in unknown environments conditioned on grid-based plans. arXiv preprint arXiv:2001.00735, 2020.
Agrim Gupta, Justin Johnson, Li Fei-Fei, Silvio Savarese, and Alexandre Alahi. Social gan: Socially acceptable trajectories with generative adversarial networks. In Proceedings of the IEEE Conference on Computer Vision and Pattern Recognition, pp. 2255-2264, 2018.
Dirk Helbing and Peter Molnar. Social force model for pedestrian dynamics. Physical review E, 51(5):4282, 1995.
Vineet Kosaraju, Amir Sadeghian, Roberto Martin-Martin, Ian Reid, S Hamid Rezatofighi, and Silvio Savarese. Socialbigat: Multimodal trajectory forecasting using bicyclegan and graph attention networks. arXiv preprint arXiv:1907.03395, 2019.
Parth Kothari, Sven Kreiss, and Alexandre Alahi. Human trajectory forecasting in crowds: A deep learning perspective. arXiv preprint arXiv:2007.03639, 2020.
Alex Krizhevsky, Ilya Sutskever, and Geoffrey E Hinton. Imagenet classification with deep convolutional neural networks. Advances in neural information processing systems, 25:1097-1105, 2012.
Sumit Kumar, Yiming Gu, Jerrick Hoang, Galen Clark Haynes, and Micol Marchetti-Bowick. Interaction-based trajectory prediction over a hybrid traffic graph. arXiv preprint arXiv:2009.12916, 2020.
Yann LeCun. The mnist database of handwritten digits. http://yann. lecun. com/exdb/mnist/.
Namhoon Lee, Wongun Choi, Paul Vernaza, Christopher B Choy, Philip HS Torr, and Manmohan Chandraker. Desire: Distant future prediction in dynamic scenes with interacting agents. In Proceedings of the IEEE Conference on Computer Vision and Pattern Recognition, pp. 336-345, 2017.
Jiachen Li, Hengbo Ma, and Masayoshi Tomizuka. Conditional generative neural system for probabilistic trajectory prediction. arXiv preprint arXiv:1905.01631, 2019.
Matteo Lisotto, Pasquale Coscia, and Lamberto Ballan. Social and scene-aware trajectory prediction in crowded spaces. In Proceedings of the IEEE/CVF International Conference on Computer Vision Workshops, pp. 0-0, 2019.
Bingbin Liu, Ehsan Adeli, Zhangjie Cao, Kuan-Hui Lee, Abhijeet Shenoi, Adrien Gaidon, and Juan Carlos Niebles. Spatiotemporal relationship reasoning for pedestrian intent prediction, 2020.
Srikanth Malla, Behzad Dariush, and Chiho Choi. Titan: Future forecast using action priors. In Proceedings of the IEEE/CVF Conference on Computer Vision and Pattern Recognition, pp. 11186-11196, 2020.
Karttikeya Mangalam, Yang An, Harshayu Girase, and Jitendra Malik. From goals, waypoints & paths to long term human trajectory forecasting. arXiv preprint arXiv:2012.01526, 2020.
Karttikeya Mangalam, Harshayu Girase, Shreyas Agarwal, Kuan-Hui Lee, Ehsan Adeli, Jitendra Malik, and Adrien Gaidon. It is not the journey but the destination: Endpoint conditioned trajectory prediction. In European Conference on Computer Vision, pp. 759-776. Springer, 2020.
Abduallah Mohamed, Kun Qian, Mohamed Elhoseiny, and Christian Claudel. Social-stgcnn: A social spatio-temporal graph convolutional neural network for human trajectory prediction. In Proceedings of the IEEE/CVF Conference on Computer Vision and Pattern Recognition, pp. 14424-14432, 2020.
Amir Rasouli. Pedestrian simulation: A review. arXiv preprint arXiv:2102.03289, 2021.
Amir Rasouli, Iuliia Kotseruba, Toni Kunic, and John K Tsotsos. Pie: A large-scale dataset and models for pedestrian Intention estimation and trajectory prediction. In Proceedings of the IEEE/CVF International Conference on Computer Vision, pp. 6262-6271, 2019.
Amir Rasouli, Iuliia Kotseruba, and John K Tsotsos. Are they going to cross? a benchmark dataset and baseline for pedestrian crosswalk behavior. In Proceedings of the IEEE International Conference on Computer Vision Workshops, pp. 206-213, 2017.
Nicholas Rhinehart, Rowan McAllister, Kris Kitani, and Sergey Levine. Precog: Prediction conditioned on goals in visual multi-agent settings. arXiv preprint arXiv:1905.01296, 2019.
A Robicquet, A Sadeghian, A Alahi, and S Savarese. Learning social etiquette: Human trajectory prediction in crowded scenes. In European Conference on Computer Vision (ECCV), 2020.
Andrey Rudenko, Luigi Palmieri, Michael Herman, Kris M Kitani, Dariu M Gavrila, and Kai O Arras. Human motion trajectory prediction: A survey. The International Journal of Robotics Research, 39(8):895-935, 2020.

(56) References Cited

OTHER PUBLICATIONS

Amir Sadeghian, Vineet Kosaraju, Ali Sadeghian, Noriaki Hirose, Hamid Rezatofighi, and Silvio Savarese. Sophie: An attentive gan for predicting paths compliant to social and physical constraints. In Proceedings of the IEEE Conference on Computer Vision and Pattern Recognition, pp. 1349-1358, 2019.

Tim Salzmann, Boris Ivanovic, Punarjay Chakravarty, and Marco Pavone. Trajectron++: Dynamically-feasible trajectory forecasting with heterogeneous data. arXiv preprint arXiv:2001.03093, 2020.

Yunsheng Shi, Zhengjie Huang, Shikun Feng, and Yu Sun. Masked label prediction: Unified massage passing model for semi-supervised classification. arXiv preprint arXiv:2009.03509, 2020.

Vivian V Valentin, Anthony Dickinson, and John P O'Doherty. Determining the neural substrates of goaldirected learning in the human brain. Journal of Neuroscience, 27(15):4019-4026, 2007.

Takuma Yagi, Karttikeya Mangalam, Ryo Yonetani, and Yoichi Sato. Future person localization in first-person videos. In Proceedings of the IEEE Conference on Computer Vision and Pattern Recognition, pp. 7593-7602, 2018.

Lingyao Zhang, Po-Hsun Su, Jerrick Hoang, Galen Clark Haynes, and Micol Marchetti-Bowick. Map-adaptive goal-based trajectory prediction. arXiv preprint arXiv:2009.04450, 2020.

Hang Zhao, Jiyang Gao, Tian Lan, Chen Sun, Benjamin Sapp, Balakrishnan Varadarajan, Yue Shen, Yi Shen, Yuning Chai, Cordelia Schmid, et al. Tnt: Target-driven trajectory prediction. arXiv preprint arXiv:2008.08294, 2020.

* cited by examiner

SYSTEM AND METHOD FOR PROVIDING LONG TERM AND KEY INTENTIONS FOR TRAJECTORY PREDICTION

CROSS-REFERENCE TO RELATED APPLICATION

This application claims priority to U.S. Provisional Application Ser. No. 63/166,195 filed on Mar. 25, 2021, which is expressly incorporated herein by reference.

BACKGROUND

Recent advances in trajectory prediction have shown that explicit reasoning about agents' intent is important to accurately forecast their motion. However, the current research activities are not directly applicable to intelligent and safety critical systems. This is mainly because very few public datasets are available and they only consider pedestrian-specific intents for a short temporal horizon from a restricted egocentric view.

Over the past few years, there has been extensive research into predicting future trajectories of dynamic agents in scenes, such as pedestrians and vehicles. This is an incredibly important and challenging task for safety critical applications such as autonomous vehicles or social robot navigation. While these methods have been significantly advanced over recent years, very few benchmarks specifically test if these models can accurately reason about key maneuvers such as sudden turns and lane changes of vehicles or pedestrians crossing the road. Traditional trajectory error metrics may not capture performance on frame level maneuvers, which is critical for safe planning.

BRIEF DESCRIPTION

According to one aspect, a computer-implemented method for providing long term and key intentions for trajectory prediction that includes receiving image data and LiDAR data associated with RGB images and LiDAR point clouds that are associated with a surrounding environment of an ego agent. The computer-implemented method also includes processing a long term and key intentions for trajectory prediction dataset (LOKI dataset) that is utilized to complete joint trajectory and intention prediction for heterogeneous traffic agents. The LOKI dataset is populated with annotations that include image data and LiDAR data and annotated labels that pertain to attributes that influence agent intent for each of the heterogeneous traffic agents. The computer-implemented method additionally includes encoding a past observation history of each of the heterogeneous traffic agents and sampling a respective goal. The computer-implemented method further includes decoding and predicting future trajectories associated with each of the heterogeneous traffic agents based on data included within the LOKI dataset, the encoded past observation history, and the respective goal.

According to another aspect, a system for providing long term and key intentions for trajectory prediction that includes a memory storing instructions when executed by a processor cause the processor to receive image data and LiDAR data associated with RGB images and LiDAR point clouds that are associated with a surrounding environment of an ego agent and process a long term and key intentions for trajectory prediction dataset (LOKI dataset) that is utilized to complete joint trajectory and intention prediction for heterogeneous traffic agents. The LOKI dataset is populated with annotations that include image data and LiDAR data and annotated labels that pertain to attributes that influence agent intent for each of the heterogeneous traffic agents. The instructions also cause the processor to encode a past observation history of each of the heterogeneous traffic agents and sampling a respective goal. The instructions further cause the processor to decode and predict future trajectories associated with each of the heterogeneous traffic agents based on data included within the LOKI dataset, the encoded past observation history, and the respective goal.

According to yet another aspect, a non-transitory computer readable storage medium storing instructions that when executed by a computer, which includes a processor perform a method that includes receiving image data and LiDAR data associated with RGB images and LiDAR point clouds that are associated with a surrounding environment of an ego agent. The method also includes processing a long term and key intentions for trajectory prediction dataset (LOKI dataset) that is utilized to complete joint trajectory and intention prediction for heterogeneous traffic agents. The LOKI dataset is populated with annotations that include image data and LiDAR data and annotated labels that pertain to attributes that influence agent intent for each of the heterogeneous traffic agents. The method additionally includes encoding a past observation history of each of the heterogeneous traffic agents and sampling a respective goal. The method further includes decoding and predicting future trajectories associated with each of the heterogeneous traffic agents based on data included within the LOKI dataset, the encoded past observation history, and the respective goal.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
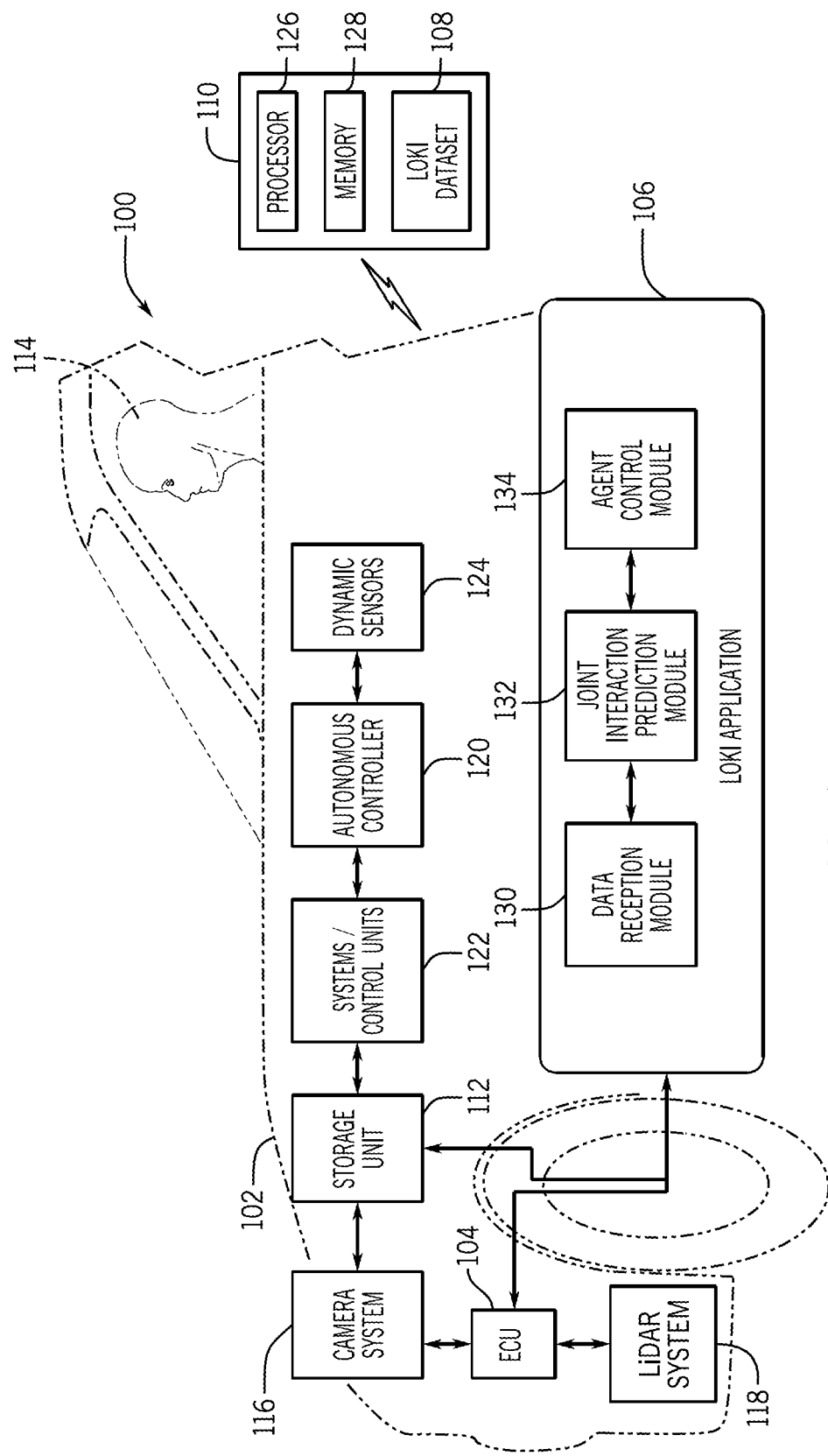
FIG. 1 is a schematic view of an exemplary system for providing long term and key intentions for trajectory prediction according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system for providing long term and key intentions for trajectory prediction according to an exemplary embodiment of the present disclosure. The components of the system 100, as well as the components of other systems, hardware architectures, and software architectures discussed herein, may be combined, omitted, or organized into different architectures for various embodiments.

Generally, the system includes an ego agent 102 that includes an electronic control unit (ECU) 104 that executes one or more applications, operating systems, agent system and subsystem user interfaces, among others. The ECU 104 may also execute a long term and key intentions trajectory prediction application (LOKI application) 106 that maybe configured to provide long term and key intentions for trajectory prediction of the ego agent 102 and/or one or more heterogeneous traffic agents (e.g., pedestrians and vehicles) that may be located within the surrounding environment of the ego agent 102.

The ego agent 102 may include, but may not be limited to, a vehicle, a robot, a motorized bicycle/scooter, an automated shopping cart, an automated carrier/carriage/suit case, a motorized wheel chair, and the like. The LOKI application 106 may be configured to receive data associated with a surrounding environment of the ego agent 102. As discussed in more detail below, such data may be analyzed by the LOKI application 106 to process a novel large-scale dataset named a long term and key intentions for trajectory prediction dataset (LOKI dataset) 108 that is stored upon an externally hosted computing infrastructure (external server) 110 to be accessed by the ego agent 102 and/or one or more heterogenous traffic agents. The LOKI dataset 108 may be configured to process trajectory and intention prediction for heterogeneous traffic agents that are located within the surrounding environment of the ego agent 102.

In an exemplary embodiment, the LOKI dataset 108 may be processed to discover several factors that may affect intention, including, but not limited to i) an ego agent's own will, ii) social interactions, iii) environmental constraints, and iv) contextual information. The LOKI application 106 is also configured to provide an improvement to the technology of heterogenous traffic trajectory and intention prediction. This functionality may be used to utilize recurrently reasoning with respect to intention of each of the heterogenous traffic agents in the surrounding environment of the ego agent 102 to assist with trajectory prediction that is associated with each of the heterogenous traffic agents that are located within the surrounding environment of the ego agent 102.

As discussed in more detail below, the LOKI application 106 may be configured to complete task prediction with respect to heterogeneous multi-agent trajectory forecasting and intention predication. The LOKI application 106 may be configured to define goals to be a final position that each agent (e.g., each of a plurality of heterogeneous traffic agents and the ego agent 102 that are located within the surrounding environment of the ego agent 102) wants to reach for a given prediction horizon. The LOKI application 106 may additionally define intention as how an agent accomplishes their respective goals.

In an exemplary embodiment, using an observation encoder that receives actor trajectories that may be based on the merged image-LiDAR data, the LOKI application 106 may be configured to encode past observation history of each agent to propose a long-term goal distribution over potential final destinations for each agent independently that is included within the surrounding environment. The LOKI application 106 may also be configured to decode trajectories of each of the heterogenous traffic agents using the LOKI dataset 108.

In one or more embodiments, the LOKI application 106 may be configured to process a scene graph to allow agents to share trajectory information, intentions, and long-term goals. Nodes of the graph may denote road entrance and road exit information which may provide agents with map topology information. At each time steps, current scene information is propagated through the graph. The system is thereby configured to predict an intent for each agent that pertains to what action each respective agent may take at one or more future time steps. A trajectory decoder of the system is conditioned on predicted intentions, goals, past motion, and scene before forecasting the next position. This process may be recurrently repeated for the horizon length.

Accordingly, the LOKI dataset 108 may enable the LOKI application 106 to complete traditional trajectory prediction as well as provide an understanding on how intent changes over a long-time horizon. The LOKI application 106 may provide the LOKI dataset 108 as a first that may be used as a benchmark for intention understanding for both vehicles and pedestrians. The LOKI application 106 may thereby utilize the LOKI dataset 108 to perform a joint trajectory and intention prediction framework which may outperform current state-of-the-art trajectory prediction metrics and may offer a strong baseline for intention prediction.

In an exemplary embodiment, the LOKI application 106 may be configured to provide commands to control one or more systems of the ego agent 102. Such commands may include alert control commands and/or autonomous control commands that may be utilized to provide one or more alerts (e.g., trajectory-based warnings) and/or agent autonomous controls that may be associated with the ego agent 102.

With continued reference to FIG. 1, the ECU 104 may be configured to be operably connected to a plurality of additional components of the ego agent 102, including, but not limited to, a storage unit 112, a camera system 116, a LiDAR system 118, an autonomous controller 120, systems/control units 122, and dynamic sensors 124. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego agent 102.

The ECU 104 may also include a communication device (not shown) for sending data internally within (e.g., between one or more components) the ego agent 102 and communicating with externally hosted computing systems (e.g., external to the ego agent 102). Generally, the ECU 104 may communicate with the storage unit 112 to execute the one or more applications, operating systems, system and subsystem user interfaces, and the like that are stored within the storage unit 112.

In one embodiment, the ECU 104 may communicate with the autonomous controller 120 to execute autonomous driving commands to operate the ego agent 102 to be fully autonomously driven or semi-autonomously driven in a particular manner. As discussed below, the autonomous driving commands may be based on commands provided by the LOKI application 106 to navigate the ego agent 102 within the surrounding environment to autonomously control one or more functions of the ego agent 102 to account for the predicted trajectories of one or more of the heterogeneous traffic agents that are located within the surrounding environment of the ego agent 102. In particular, the autonomous driving commands may be based on commands provided by the LOKI application 106 to navigate the ego agent 102 within the surrounding environment to autonomously control one or more functions of the ego agent 102 to travel within the surrounding environment while avoiding any overlap at concurrent time steps with respect to the predicted trajectories of one or more of the heterogeneous traffic agents that are located within the surrounding environment of the ego agent 102.

In one or more embodiments, the autonomous controller 120 may autonomously control the operation of the ego agent 102 by providing one or more commands to one or more of the systems/control units 122 to provide full autonomous or semi-autonomous control of the ego agent 102 to follow agent autonomous commands provided by the application 106. Such autonomous control of the ego agent 102 may be provided by sending one or more commands to control one or more of the systems/control units 122 to operate (e.g., drive, navigate) the ego agent 102 during one or more circumstances (e.g., when providing driver assist controls), and/or to fully control operation of the ego agent 102.

In some embodiments, one or more commands may be provided to control one or more advanced driver assist systems (ADAS) (not shown) of the ego agent 102 that may be manually driven by an operator 114 (e.g., driver) to provide one or more alerts and/or warnings account for the predicted trajectories of one or more of the heterogeneous traffic agents that are located within the surrounding environment of the ego agent 102.

The one or more commands may be provided to one or more systems/control units 122 that include, but are not limited to an engine control unit, a braking control unit, a transmission control unit, a steering control unit, and the like to control the ego agent 102 to be autonomously driven based on one or more autonomous commands that are output by the LOKI application 106 to navigate the ego agent 102 within the surrounding environment of the ego agent 102. In particular, one or more functions of the ego agent 102 may be autonomously controlled to travel within the surrounding environment while avoiding any overlap at concurrent time steps with respect to the predicted trajectories of one or more of the heterogeneous traffic agents that are located within the surrounding environment of the ego agent 102.

In one or more embodiments, the systems/control units 122 may be operably connected to the dynamic sensors 124 of the ego agent 102. The dynamic sensors 124 may be configured to receive inputs from one or more systems, sub-systems, control systems, and the like. In one embodiment, the dynamic sensors 124 may be included as part of a Controller Area Network (CAN) of the ego agent 102 and may be configured to provide dynamic data to the ECU 104 to be utilized for one or more systems, sub-systems, control systems, and the like. The dynamic sensors 124 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown).

In one configuration, the dynamic sensors 124 may provide dynamic data in the form of one or more values (e.g., numeric levels) that are associated with the real-time dynamic performance of the ego agent 102 as one or more driving maneuvers are conducted and/or as the ego agent 102 is controlled to be autonomously driven. As discussed below, dynamic data that is output by the dynamic sensors 124 may be associated with a real time dynamic operation of the ego agent 102 as it is traveling within the surrounding environment. The dynamic data may be analyzed by the LOKI application 106 to determine dynamic constraints associated with the ego agent 102 to thereby autonomously control the ego agent 102 to operate based on such constraints in a manner that avoids any overlap with the predicted trajectories of one or more heterogenous traffic agents that are located within the surrounding environment of the ego agent 102.

With continued reference to FIG. 1, the camera system 116 may include one or more of the cameras (not shown) that may be positioned in one or more directions and at one or more areas to capture one or more images of the surrounding environment of the ego agent 102 (e.g., images of the roadway on which the ego agent 102 is traveling). The one or more cameras of the camera system 116 may be disposed at external front portions of the ego agent 102, including, but not limited to different portions of a dashboard, a bumper, front lighting units, fenders, and a windshield. In one embodiment, the one or more cameras may be configured as RGB cameras that may capture RGB bands that are configured to capture rich information about object appearance, as well as relationships and interactions between the ego agent 102 and objects within the surrounding environment of the ego agent 102.

In other embodiments, the one or more cameras may be configured as stereoscopic cameras that are configured to capture environmental information in the form of three-dimensional images. In one or more configurations, the one or more cameras may be configured to capture one or more first person viewpoint RGB images/videos of the surrounding environment of the ego agent 102 from the perspective of the ego agent 102. The camera system 116 may be configured to convert one or more RGB images/videos (e.g., sequences of images) into image data that is communicated to the LOKI application 106 to be analyzed.

In an exemplary embodiment, the LiDAR system 118 may be operably connected to a plurality of LiDAR sensors (not shown). In particular, the LiDAR system 118 may include one or more planar sweep lasers that include respective three-dimensional LiDAR sensors that may be configured to oscillate and emit one or more laser beams of ultraviolet, visible, or near infrared light toward the scene of the surrounding environment of the ego agent 102. The plurality of LiDAR sensors may be configured to receive one or more reflected laser waves (e.g., signals) that are reflected off one or more objects such as surrounding vehicles located within the driving scene of the ego agent 102. In other words, upon transmitting the one or more laser beams to the surrounding environment, the one or more laser beams may be reflected as laser waves by one or more obstacles that include one or more heterogenous traffic agents that may be located within the surrounding environment of the ego agent 102 at one or more points in time.

In one embodiment, each of the plurality of LiDAR sensors may be configured to analyze the reflected laser waves and output respective LiDAR data to the LOKI application 106. The LiDAR data may include LiDAR coordinates that may be associated with the locations, positions, depths, and/or dimensions (e.g., measurements) of one or more heterogeneous traffic agents such as the surrounding vehicles and pedestrians that may be located within the surrounding environment of the ego agent 102.

As discussed below, image data provided by the camera system 116 and/or the LiDAR data provided by the LiDAR system 118 may be communicated to the LOKI application 106 to be analyzed against the one or more object classifiers to classify static objects and dynamic objects located within the surrounding environment of the ego agent 102. Additionally, the image data provided by the camera system 116 and/or the LiDAR data provided by the LiDAR system 118 may be aggregated and analyzed to determine the positions of the heterogenous traffic agents with respect to the location of the ego agent 102.

In an exemplary embodiment, the external server 110 may be owned, operated, and/or managed by an OEM, a third-party administrator, and/or a dataset manager that manages data that is associated with the operation of the LOKI application 106. The external server 110 may be operably controlled by a processor 126 that may be configured to execute the LOKI application 106. In particular, the processor 126 may be configured to execute one or more applications, operating systems, database, and the like. The processor 126 may also include internal processing memory, an interface circuit, and bus lines for transferring data, sending commands, and communicating with the plurality of components of the external server 110.

In one embodiment, the processor 126 may be operably connected to a memory 128 of the external server 110. Generally, the processor 126 may communicate with the memory 128 to execute the one or more applications, operating systems, and the like that are stored within the memory 128. In one embodiment, the memory 128 may store one or more executable application files that are associated with the LOKI application 106.

In an exemplary embodiment, the LOKI dataset 108 is configured to store annotations that include image data and LiDAR data and annotated labels that pertain to attributes that influence agent intent for each of the heterogeneous traffic agents. The annotated labels include intention labels that are associated with intentions of the pedestrians and the vehicles, environment labels that pertain to the surrounding environment, and contextual labels that are associated with factors that affect future behavior of each of the heterogeneous traffic agents.

In particular, the intention labels may be defined to be "how" an actor decides to reach a goal via a series of actions. At each frame, the LOKI application 106 may be configured to annotate the current actions of the traffic participants. The system may use future actions to generate the intention labels. The environment labels may be associated with the surrounding environment which may heavily impact the intention of the ego agent 102 and the heterogenous traffic agents. These labels may be determined by the structure of a road and the traffic rules that may be applied to any heterogenous traffic agent that is located within the surrounding environment of the ego agent 102. Lane information may include allowed actions of the current lane where the ego agent 102 is on and the relative position between other heterogenous traffic agents. The contextual labels may include other factors that may also affect the future behavior of the heterogenous traffic agents and/or the ego agent 102. Such factors may include weather, road conditions, gender, age that may be included as external contextual labels.

II. The Long Term and Key Intentions Trajectory Prediction Application and Related Methods Components of the LOKI application 106 will now be described according to an exemplary embodiment and with continued reference to FIG. 1. In an exemplary embodiment, the LOKI application 106 may be stored on the storage unit 112 and executed by the ECU 104 of the ego agent 102. In another embodiment, the LOKI application 106 may be stored on the memory 128 of the external server 110 and may be accessed by a telematics control unit of the ego agent 102 to be executed by the ECU 104 of the ego agent 102.

The general functionality of the LOKI application 106 will now be discussed. In an exemplary embodiment, the LOKI application 106 may include a plurality of modules 130-134 that may be configured to provide driver situation awareness prediction using human visual sensory and memory mechanism. The plurality of modules 130-134 may include a data reception module 130, a joint interaction prediction module (interaction prediction module) 132, and an agent control module 134. However, it is appreciated that the LOKI application 106 may include one or more additional modules and/or sub-modules that are included in lieu of the modules 130-134.

Figure 2:
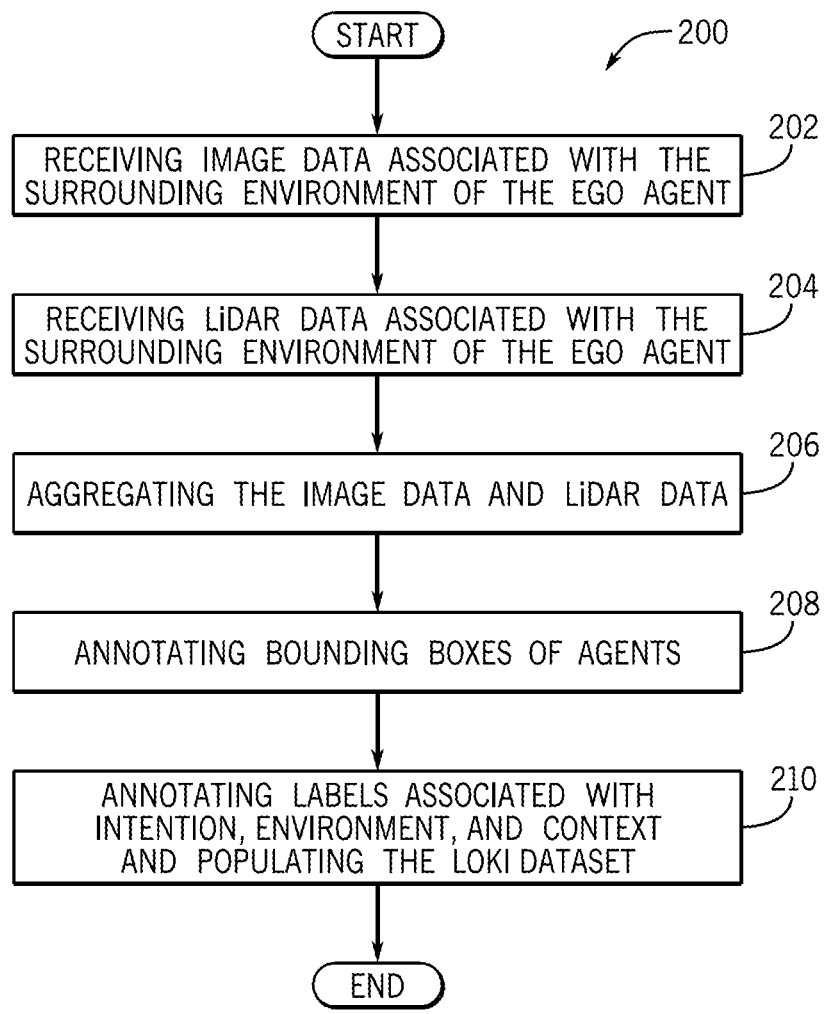
FIG. 2 is a process flow diagram of a method for populating a LOKI dataset according to an exemplary embodiment of the present disclosure.

FIG. 2 is a process flow diagram of a method 200 for populating the LOKI dataset 108 according to an exemplary embodiment of the present disclosure. FIG. 2 will be described with reference to the components of FIG. 1 though it is to be appreciated that the method 200 of FIG. 2 may be used with other systems/components. The method 200 may begin at block 202, wherein the method 200 may include receiving image data associated with the surrounding environment of the ego agent 102.

In one embodiment, the data reception module 130 of the LOKI application 106 may be configured to communicate with the camera system 116 to collect image data associated with untrimmed images/video of the surrounding environment of the ego agent 102. In some configurations, the image data may pertain to one or more first person viewpoint RGB images/videos of the surrounding environment of the ego agent 102. In particular, the image data may pertain to one or more RGB images/video of the surrounding static objects and dynamic objects that are located within the surrounding environment that are captured by one or more cameras that are operably connected to the camera system 116. In some embodiments, the data reception module 130 may package and store the image data on the storage unit 112 to be evaluated at one or more points in time.

The method 200 may proceed to block 204, wherein the method 200 may include receiving LiDAR data associated with the surrounding environment of the ego agent 102. In an exemplary embodiment, the data reception module 130 may communicate with the LiDAR system 118 of the ego agent 102 to collect LiDAR data that includes LiDAR based observations from the ego agent 102. The LiDAR based observations may indicate the location, range, and positions of the one or more objects off which the reflected laser waves were reflected with respect to a location/position of the ego agent 102. In some embodiments, the data reception module 130 may package and store the LiDAR data on the storage unit 112 to be evaluated at one or more points in time.

The method 200 may proceed to block 206, wherein the method 200 may include aggregating the image data and LiDAR data. In an exemplary embodiment, the data reception module 130 may communicate with the interaction prediction module 132 of the LOKI application 106 to provide artificial intelligence capabilities to conduct multi-modal aggregation of the image data received from the camera system 116 with the LiDAR data received from the LiDAR system 118. The interaction prediction module 132 may aggregate the image data and the LiDAR data into aggregated environment data that is associated with the surrounding environment of the ego agent 102 to be evaluated further by the interaction prediction module 132 to provide annotations.

The method 200 may proceed to block 208, wherein the method 200 may include annotating bounding boxes of agents. In an exemplary embodiment, the interaction prediction module 132 may be configured to analyze LiDAR point clouds and image coordinates based on the environment data. The interaction prediction module 132 may be configured to process bounding boxes that are respectively associated with static objects (e.g., trees, buildings, poles, cones, barrels, physical barriers, guardrails, traffic signage), dynamic objects (e.g., other vehicles, pedestrians), traffic markings, traffic infrastructure, and the like that are located within the surrounding environment of the ego agent 102.

In one embodiment, the interaction prediction module 132 may be configured to annotate each of the 3D bounding boxes that are associated with each respective heterogenous agent with an object classification that may be associated with a description of each heterogenous agent with respect to the static objects, dynamic objects, traffic markings, physical barriers, guardrails, traffic signage, traffic infrastructure, and the like that are located within the surrounding environment of the ego agent 102. The annotations may indicate descriptions such as a relative position of each object with respect to the ego agent 102, a gender or age of each pedestrian, a state of each traffic light, a type of traffic sign, a type of road marking, a type of vehicle, and the like. The interaction prediction module 132 may also be configured to process 2D bounding boxes that may pertain to roadway infrastructure and heterogenous trajectory information. The 2D bounding boxes may include potential destination and road entrance/exit information, and the like.

The method 200 may proceed to block 210, wherein the method 200 may include annotating labels associated with intention, environment, and context and populating the LOKI dataset 108. In an exemplary embodiment, upon annotation of the bounding boxes, the interaction prediction module 132 may be configured to annotate labels that pertain to attributes that may influence operation of each of the heterogenous traffic agents. In one embodiment, the interaction prediction module 132 may be configured to annotate each of the heterogenous labels with annotated labels that include intention labels, environmental labels, and contextual labels.

In one embodiment, the intention labels are associated with intentions of each of the heterogenous traffic agents. Intentions may be defined to be "how" each agent decides to reach a goal (e.g., a particular waypoint, a particular destination), with a series of actions. In one configuration, for a series of time steps (e.g., t−n, t−2, t−1, t) the interaction prediction module 132 may be configured to annotate the current actions of the heterogenous traffic agents. The interaction prediction module 132 may utilize further actions at subsequent timesteps (e.g., t, t+1, t+2, t+n) to generate intention labels that are associated with each of the heterogenous traffic agents. For example, if a current action at time t of a vehicle (heterogenous agent) that is located within the environment is "moving" and the future action at time t+1 is "stopped," the vehicle's current intention is to stop. It is appreciated that various intention horizons may be explored. For example, 0.8 s may be explored as a short-term intention prediction that may help guide trajectory prediction.

In one or more embodiments, the environmental labels are associated with the surrounding environment of the ego agent 102. In particular, the surrounding environment may particularly impact the intention of each heterogenous agent especially for driving area users. In one example, the environmental information includes "road exit and entrance" positions, "traffic lights," "traffic signs," "lane information," and the like. Such labels may be determined by a structure of the roadway on which each heterogenous agent is traveling within the surrounding environment of the ego agent 102. The lane information may include allowed actions of the current lane where each heterogenous agent is traveling and the relative position between each of the heterogenous traffic agents.

In one embodiment, the contextual labels may be associated with factors that may affect the future behavior of the ego agent 102 and/or the heterogenous traffic agents within the surrounding environment of the ego agent 102. In one example, the contextual labels may be defined as "weather," "road conditions," "gender," "age," and the like. The contextual labels may indicate the factors are the characters of the agent or environment which may cause the different intentions even under similar environment condition.

In an exemplary embodiment, upon annotating the intention labels, the environmental labels, and the contextual labels, the interaction prediction module 132 may be configured to access the LOKI dataset 108 stored upon the memory 128 of the external server 110 and may populate the LOKI dataset 108 with the intention labels, the environmental labels, and the contextual labels that are associated with each of the heterogenous traffic agents that are located within the surrounding environment of the ego agent 102. The LOKI dataset 108 may thereby be accessed and utilized as a large-scale dataset that is designed for a task of joint intention and trajectory prediction.

Figure 3:
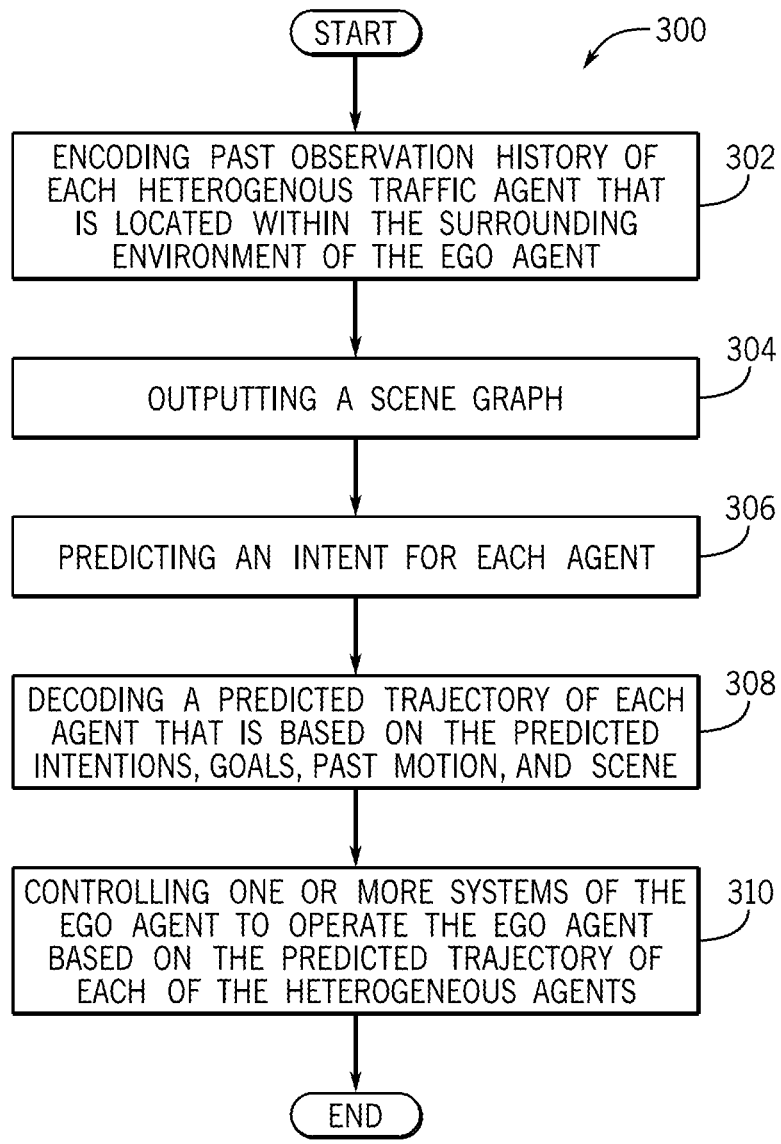
FIG. 3 is process flow diagram of a method for decoding and predicting future trajectories associated with each of the heterogeneous traffic agents based on data included within the LOKI dataset according to an exemplary embodiment of the present disclosure.

FIG. 3 is a process flow diagram of a method 300 for decoding and predicting future trajectories associated with each of the heterogeneous traffic agents based on data included within the LOKI dataset 108 according to an exemplary embodiment of the present disclosure. FIG. 3 will be described with reference to the components of FIG. 1 though it is to be appreciated that the method 300 of FIG. 3 may be used with other systems/components. The method 300 of FIG. 3 may begin at block 302, wherein the method 300 may include encoding past observation history of each heterogenous traffic agent that is located within the surrounding environment of the ego agent 102.

In an exemplary embodiment, the interaction prediction module 132 may be configured to complete multi-agent trajectory forecasting while concurrently predicting agent intentions. The type of intentions may vary between agent classes: vehicles and pedestrians. The interaction prediction module 132 may formulate the problem as follows: suppose in a given scene, there are N agents, $A_{1:N}$. Given the past $t_{obs}=3$ s of trajectory history in coordinates, the problem requires forecasting the future $t_{pred}=5$ s coordinates of the agent in top-down image space. As the LOKI dataset 108 allows for frame-wise intention predictions depending on agent type (pedestrians vs. vehicles), another task to predict discrete intentions for each heterogenous traffic agent may be defined at each timestep, in addition to the traditionaltrajectory prediction problem.

Intuitively, each of the heterogenous traffic agents may have a predetermined, long-term goal that they aim to reach. For each agent, $A_k$, that module 132 may use a Conditional Variational Autoencoder (CVAE) to estimate the final long-term goal $G_k$ that is simply the estimated position in BEV $u_{k_f}=(x_{k_f}, y_{k_f})$ where f indicates a final frame.

Figure 4:
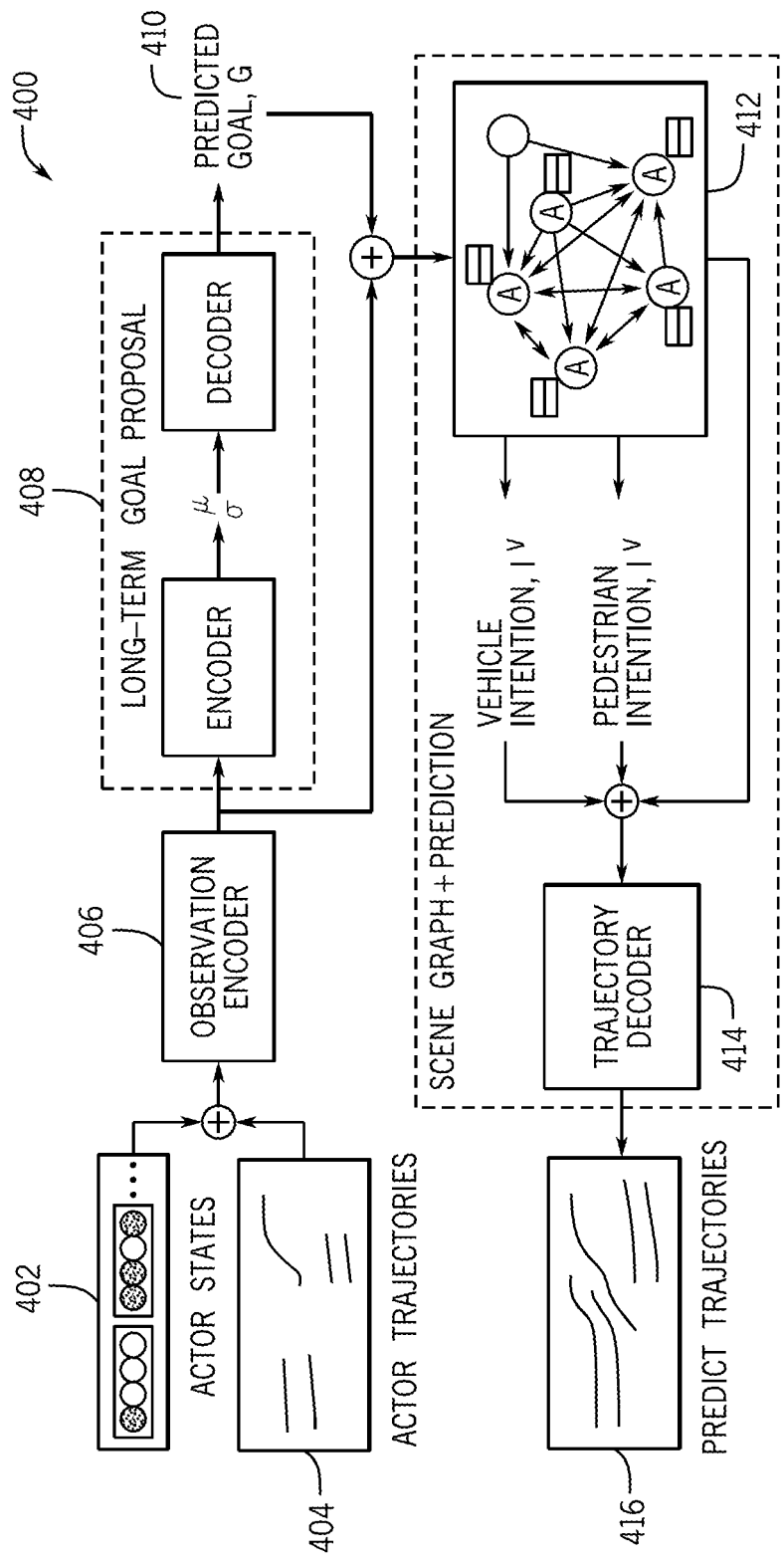
FIG. 4 is a schematic overview of an encoder-decoder structure of an interaction prediction module of a LOKI application according to an exemplary embodiment of the present disclosure.

With reference to FIG. 4, a schematic overview of an encoder-decoder structure 400 of the interaction prediction module 132 of the LOKI application 106 according to an exemplary embodiment of the present disclosure. As shown, in one embodiment, for each heterogenous traffic agent, actor states 402 and actor trajectories 404 are inputted to an observation encoder 406. The past observation history of each heterogenous traffic agent may be encoded using the observation encoder 406. A long-term goal proposal 408 may be completed that proposes a long-term goal distribution over potential final destination of each heterogenous traffic agent independently. A predicted goal G 410 is then output and passed using the interaction prediction module 132.

Referring again to the method 300 of FIG. 3, upon encoding past observation history of each heterogenous traffic agent, the method 300 may proceed to block 304, wherein the method 300 may include outputting a scene graph. In an exemplary embodiment, the interaction prediction module 132 may be configured to construct a scene graph that is associated with the surrounding environment of the ego agent 102. As shown in the schematic overview of an encoder-decoder structure 400 of FIG. 4, the scene graph 412 may be constructed with nodes that pertain to agent, object, intention, and roadway information associated with the surrounding environment of the ego agent 102.

In particular, the scene graph 412 may be constructed to allow the ego agent 102 and the heterogenous traffic agents (e.g., through V2V and/or wireless communications using portable wireless devices) to share trajectory information, intentions, and long-term goals. The scene graph 412 may include black nodes that denote road entrance/exit information which may provide the ego agent 102 and the heterogenous traffic agents with map topology information. In other words, the nodes of the scene graph 412 may include trajectory information, intentions, and long-term goals of the heterogenous traffic agents that are located within the surrounding environment of the ego agent 102 along with map topology information that is associated with the roadway topology of the surrounding environment of the ego agent 102.

In one embodiment, without loss of generality, the agents, A, and intentions, I, without specifying the type of agent. Accordingly, the traffic scene graph is constructed to account for social and environmental factors that may affect intent and trajectory prediction. More concretely, suppose we have a scene graph $\mathcal{G} =(v,\epsilon)$ where vertices, $v$, denote agents and road entrances/exits and edges $\epsilon$, capture agent-agent and agent-map influence. In a given scene that includes the surrounding environment of the ego agent 102, for neighboring agents $v_i$ and $v_j$, there is a directional edge $e_{ij}$ i affects agents j (within a certain distance threshold away). A directional edge $e_{ij}$ road entrance/exit node i is within a certain distance from agent j.

Referring again to the method 300 of FIG. 3, upon outputting the scene graph 412, the method 300 may proceed to block 306, wherein the method 300 may include predicting an intent for each agent. With reference to FIG. 4, the interaction prediction module 132 may be configured to predict intentions for each heterogenous agent vehicle and each heterogenous agent pedestrian that is located within the surrounding environment of the ego agent 102.

In one embodiment, the interaction prediction module 132 may be configured to predict each agent's future locations via a daisy chained process. In particular, at each frame, m the interaction prediction module 132 shares information between agents via the attention mechanism used below:

$$x_i^{t+1} = \text{Reject}(x_i^t) + \Sigma_{x_j \in N(x_i)} \text{Reject}_{ij} \text{Reject} \, \mathcal{H}(x_j^t, e_{ij}),$$

where $x_i^{t+1}$ represents the updated node features following attention-based feature aggregation with all of its neighbors $x_j \in \mathcal{N}(x_i)$.

The interaction prediction module 132 uses the agents' velocities and relative positions as edge features. These features are encoded by a two-layer multilayer perceptron (MLP) prior to message passing at each timestep. A scaled dot-production attention formulation is used as follows:

$$a_{ij} = \text{softmax}\left(\frac{\mathcal{H}(x_i)^T \text{Reject}(x_j, e_{ij})}{\sqrt{d} \, \text{Reject}}\right)$$

Here, $a_{ij}$ represents the attention coefficient between two nodes i and j and d represents the degree of the node. A single-layer for $\varphi$, $\gamma$, $\psi$, and $\xi$ is used.

After message passing which allows the heterogenous traffic agents to share their past trajectory, goal, and intention information along with road information through the road entrance/exit nodes, the interaction prediction module 132 is configured to then predict agent intent, which is defined to be the agent's future action m+q frames ahead. In one example, q=4, thus predicting short-term intent 0.8 s in the future.

With continued reference to FIG. 3, the method 300 may proceed to block 308, wherein the method 300 may include decoding a predicted trajectory of each agent that is based on the predicted intentions, goals, past motion, and scene. In an exemplary embodiment, the interaction prediction module 132 is configured to condition trajectory prediction for frame m+1 based on agent intent at frame m.

Formally, at each frame, m, the probability distribution over a discrete set of intentions is estimated (different set of intentions for pedestrian vs. vehicle) for an agent, $A_i$:

$$P(I_{i_m}|I_{ob:m-1}, U_{i_{0:m-1}}, G_i, a_{i_{0:ob}}, \text{Reject}_{A_j \in N(A_i)} I_{j_{ob:m-1}}, U_{j_{0:m-1}}, G_j, aa_{j_{0:ob}}, R_{ee})$$

where I refers to intention, U is position, G is long-term positional goal, a is action, and $R_{ee}$ refers to road entrances/exit labels. The intention networks are two-layer MPLs which predict intention using each actor's updated hidden states from the most recent message passing. Following this, the next position of each agent, U, is predicted and is conditioned as follows:

$$P(U_{i_{m+1}}|I_{i_{0:m}}, U_{i_{0:m}}, G_i, a_{i_{0:ob}}, \text{Reject}_{A_j \in N(A_i)} I_{j_{0:m}}, U_{j_{0:m}}, G_j, aa_{j_{0:ob}}, R_{ee})$$

Accordingly, upon predicting of an intent of each heterogenous agent (what action will each agent take in the near future at one or more future time steps), a trajectory decoder 414 is conditioned on predicted intentions, goals, past motion, and scene before forecasting the next position for each heterogenous agent that is located within the surrounding environment of the ego agent 102. The trajectory decoder 414 consists of a GRU that updates each actor's current hidden state followed by a two-layer MPL used to predict positions at each step. In an exemplary embodiment, the interaction prediction module 132 may be configured to utilize the trajectory decoder 414 to output predicted trajectories of each of the heterogenous traffic agents using the LOKI dataset 108. In particular, the trajectory decoder 414 may be configured to access the LOKI dataset 108 and analyze the LOKI dataset 108 in addition to the scene graph 412 to determine the predicted intentions, goals, and past motion of all of the heterogenous traffic agents and the scene of the surrounding environment of the ego agent 102 to predict the trajectories 416 of each of the heterogenous traffic agents that are located within the surrounding environment of the ego agent 102.

With continued reference to the method 300 of FIG. 3, upon decoding a predicted trajectory of each heterogenous traffic agent, the method 300 may proceed to block 310, wherein the method 300 may include controlling one or more systems of the ego agent 102 to operate the ego agent 102 based on the predicted trajectory of each of the heterogenous traffic agents.

In an exemplary embodiment, upon receiving the outputted predicted trajectories of each of the heterogenous traffic agents from the trajectory decoder 414, the interaction prediction module 132 may be configured to communicate trajectory data that pertains to the predicted trajectories of the heterogenous traffic agents. In one configuration, the trajectory data may include geo-locational coordinates that track the respective predicted trajectories of each of the heterogenous traffic agents at a plurality of time steps (t, t+1, t+2, t+n).

In one embodiment, the agent control module 134 may be configured to analyze the trajectory data and the geo-location of the ego agent 102 within the surrounding environment of the ego agent 102. In one configuration, the agent control module 134 may be configured to output agent autonomous commands that may be associated with driving parameters to autonomously control the operation of the ego agent 102 to account for the predicted trajectories of the heterogenous traffic agents.

In one embodiment, the agent control module 134 may be configured to communicate the autonomous control commands to the autonomous controller 120 of the ego agent 102. The autonomous controller 120 may thereby operably control the systems/control units 122 of the ego agent 102 to autonomously operate the ego agent 102 according to the autonomous control commands to providing one or more driving maneuvers to navigate the ego agent 102 within the surrounding environment. Accordingly, one or more functions of the ego agent 102 may be autonomously controlled to travel within the surrounding environment while avoiding any overlap at concurrent time steps with respect to the predicted trajectories of one or more of the heterogeneous traffic agents that are located within the surrounding environment of the ego agent 102.

In particular, the ego agent 102 may be operably controlled to autonomously operate (e.g., with the application 106 of a particular speed, acceleration, steering angle, throttle angle, braking force, etc.) according to the autonomous control commands that adhere to dynamic constraints of the ego agent 102 to operate within the surrounding environment without overlap with static obstacles and the predicted trajectories of the heterogenous traffic agents while simultaneously optimizing speed and steering, and minimizing control effort associated with autonomous dynamic parameters of the ego agent 102.

In another embodiment, the agent control module 134 may be configured to analyze the trajectory data and further thresholding that may be associated with the type of each heterogenous traffic agent and the position of each object. In one configuration, the agent control module 134 may be configured to output alert output commands to the systems/control units 122 of the ego agent 102 to provide the operator 114 of the ego agent 102 with one or more warnings and/or alerts that may be associated with the predicted trajectories of the heterogenous traffic agents that are located within the driving scene.

Figure 5:
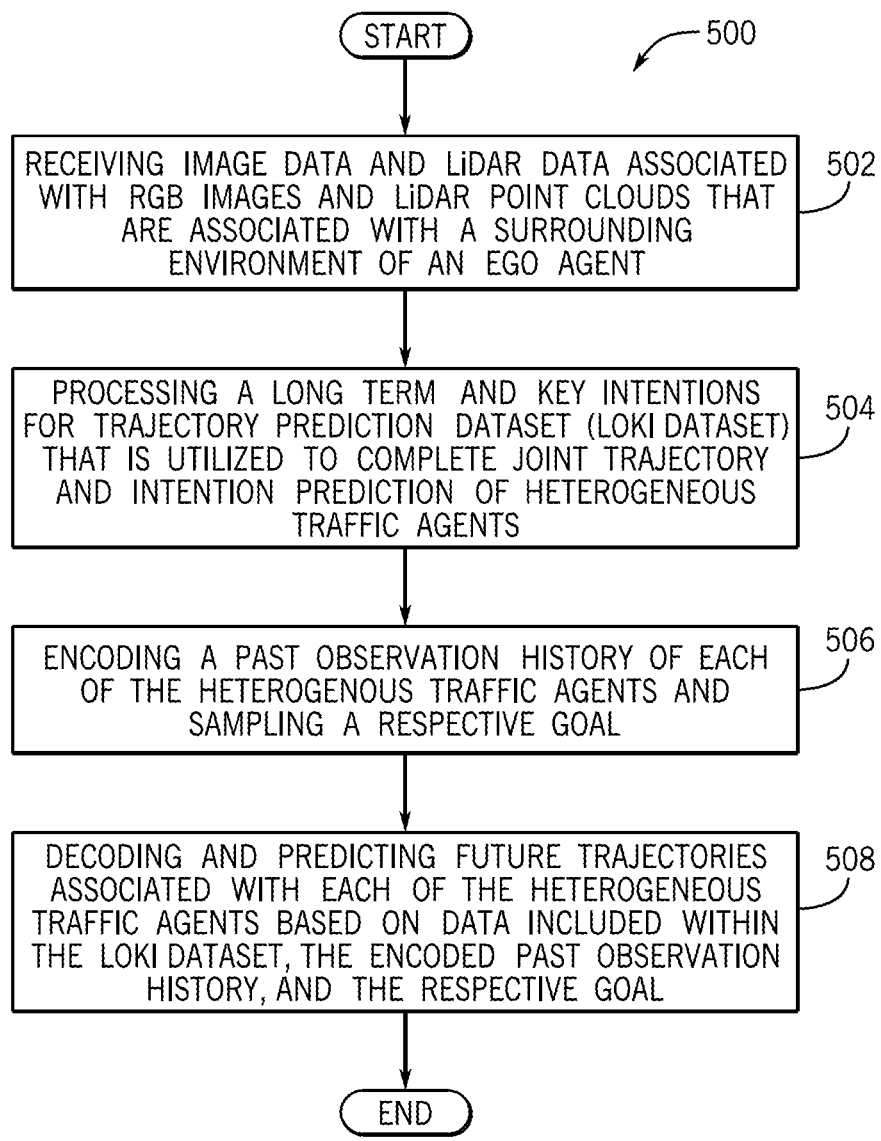
FIG. 5 is a process flow diagram of a method for providing long term and key intentions for trajectory prediction according to an exemplary embodiment of the present disclosure.

FIG. 5 is a process flow diagram of a method 500 for providing long term and key intentions for trajectory prediction according to an exemplary embodiment of the present disclosure. FIG. 5 will be described with reference to the components of FIG. 1 though it is to be appreciated that the method 500 of FIG. 5 may be used with other systems/components. The method 500 may begin at block 502, wherein the method 500 may include receiving image data and LiDAR data associated with RGB images and LiDAR point clouds that are associated with a surrounding environment of an ego agent 102.

The method 500 may proceed to block 504, wherein the method 500 may include processing a long term and key intentions for trajectory prediction dataset (LOKI dataset) that is utilized to complete joint trajectory and intention prediction for heterogeneous traffic agents. The method 500 may proceed to block 506, wherein the method 500 may include encoding a past observation history of each of the heterogeneous traffic agents and sampling a respective goal. The method 500 may proceed to block 508, wherein the method 500 may include decoding and predicting future trajectories associated with each of the heterogeneous traffic agents based on data included within the LOKI dataset, the encoded past observation history, and the respective goal.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for providing long term and key intentions for trajectory prediction, comprising:
  receiving and aggregating image data and LiDAR data associated with RGB images and LiDAR point clouds that are associated with a surrounding environment of an ego agent, wherein
  the aggregated image data and LiDAR data is aggregated environment data;
  processing a long term and key intentions for trajectory prediction dataset (LOKI dataset) that is utilized to complete joint trajectory and intention prediction for heterogeneous traffic agents, wherein the LOKI dataset is populated with annotations that include the aggregated environment data and annotated labels that pertain to attributes that influence agent intent for each of the heterogeneous traffic agents;
  encoding a past observation history of each of the heterogeneous traffic agents and sampling a respective goal; and
  decoding and predicting future trajectories associated with each of the heterogeneous traffic agents based on data included within the LOKI dataset, the encoded past observation history, and the respective goal, wherein the annotated labels include contextual labels that are associated with factors that affect future behavior of each of the heterogeneous traffic agents including at least one of weather and road conditions, a scene graph derived from the LOKI dataset is constructed that includes nodes including agent trajectory information, agent intent information, and goal information of the heterogenous traffic agents located within the surrounding environment of the ego agent, and nodes denoting road entrance and road exit information which provide the heterogeneous traffic agents with map topology information pertaining to the surrounding environment, and decoding and predicting future trajectories includes a decoder being configured to access the LOKI dataset to analyze the LOKI dataset in addition to the scene graph to determine the predicted intentions, goals, and past motion of all of the heterogenous traffic agents and a scene of the surrounding environment of the ego agent to predict the trajectories of each of the heterogenous traffic agents that are located within the surrounding environment of the ego agent.

2. The computer-implemented method of claim 1, wherein the RGB images and LiDAR point clouds capture the heterogeneous traffic agents that are located within the surrounding environment, wherein the heterogeneous traffic agents include pedestrians and vehicles.

3. The computer-implemented method of claim 2, wherein the annotated labels include intention labels that are associated with intentions of the pedestrians and the vehicles.

4. The computer-implemented method of claim 2, wherein the annotated labels include environment labels that pertain to the surrounding environment of the ego agent.

5. The computer-implemented method of claim 1, wherein the annotated labels include the contextual labels that are associated with the factors that affect the future behavior of each of the heterogeneous traffic agents including at least one of the weather, the road conditions, gender, and age.

6. The computer-implemented method of claim 1, wherein encoding the past observation history includes inputting actor states and actor trajectories of each of the heterogenous agents within an observation encoder to process a long-term goal proposal that proposes a long-term goal distribution over potential final destination of each heterogeneous traffic agent independently.

7. The computer-implemented method of claim 1, further including controlling at least one system of the ego agent to operate the ego agent within the surrounding environment of the ego agent based on the predicted future trajectories associated with each of the heterogeneous traffic agents.

8. The computer-implemented method of claim 1, wherein the annotated labels include descriptions indicating a relative position of static and dynamic objects in the surrounding environment with respect to the ego agent.

9. A system for providing long term and key intentions for trajectory prediction, comprising:

a memory storing instructions when executed by a processor cause the processor to:

receive and aggregate image data and LiDAR data associated with RGB images and LiDAR point clouds that are associated with a surrounding environment of an ego agent, wherein the aggregated image data and LiDAR data is aggregated environment data;

process a long term and key intentions for trajectory prediction dataset (LOKI dataset) that is utilized to complete joint trajectory and intention prediction for heterogeneous traffic agents, wherein the LOKI dataset is populated with annotations that include the aggregated environment data and annotated labels that pertain to attributes that influence agent intent for each of the heterogeneous traffic agents;

encode a past observation history of each of the heterogeneous traffic agents and sampling a respective goal; and decode and predict future trajectories associated with each of the heterogeneous traffic agents based on data included within the LOKI dataset, the encoded past observation history, and the respective goal, wherein the annotated labels include contextual labels that are associated with factors that affect future behavior of each of the heterogeneous traffic agents including at least one of weather and road conditions, a scene graph derived from the LOKI dataset is constructed that includes nodes including agent trajectory information, agent intent information, and goal information of the heterogenous traffic agents located within the surrounding environment of the ego agent, and nodes denoting entrance and road exit information which provide the heterogeneous traffic agents with map topology information pertaining to the surrounding environment, and decoding and predicting future trajectories includes a decoder being configured to access the LOKI dataset to analyze the LOKI dataset in addition to the scene graph to determine the predicted intentions, goals, and past motion of all of the heterogenous traffic agents and a scene of the surrounding environment of the ego agent to predict the trajectories of each of the heterogenous traffic agents that are located within the surrounding environment of the ego agent.

10. The system of claim 9, wherein the RGB images and LiDAR point clouds capture the heterogeneous traffic agents that are located within the surrounding environment, wherein the heterogeneous traffic agents include pedestrians and vehicles.

11. The system of claim 10, wherein the annotated labels include intention labels that are associated with intentions of the pedestrians and the vehicles.

12. The system of claim 10, wherein the annotated labels include environment labels that pertain to the surrounding environment of the ego agent.

13. The system of claim 9, wherein the annotated labels include the contextual labels that are associated with the factors that affect the future behavior of each of the heterogeneous traffic agents including at least one of the weather, the road conditions, gender, and age.

14. The system of claim 9, wherein encoding the past observation history includes inputting actor states and actor trajectories of each of the heterogenous agents within an observation encoder to process a long-term goal proposal that proposes a long-term goal distribution over potential final destination of each heterogeneous traffic agent independently.

15. The system of claim 9, further including controlling at least one system of the ego agent to operate the ego agent within the surrounding environment of the ego agent based on the predicted future trajectories associated with each of the heterogeneous traffic agents.

16. The system of claim 9, wherein the annotated labels include descriptions indicating a relative position of static and dynamic objects in the surrounding environment with respect to the ego agent.

17. A non-transitory computer readable storage medium storing instruction that when executed by a computer, which includes a processor perform a method, the method comprising:

receiving and aggregating image data and LiDAR data associated with RGB images and LiDAR point clouds that are associated with a surrounding environment of an ego agent, wherein
the aggregated image data and LiDAR data is aggregated environment data;

processing a long term and key intentions for trajectory prediction dataset (LOKI dataset) that is utilized to complete joint trajectory and intention prediction for heterogeneous traffic agents, wherein the LOKI dataset is populated with annotations that include the aggregated environment data and annotated labels that pertain to attributes that influence agent intent for each of the heterogeneous traffic agents;

encoding a past observation history of each of the heterogeneous traffic agents and sampling a respective goal; and decoding and predicting future trajectories associated with each of the heterogeneous traffic agents based on data included within the LOKI dataset, the encoded past observation history, and the respective goal, wherein the annotated labels include contextual labels that are associated with factors that affect future behavior of each of the heterogeneous traffic agents including at least one of weather and road conditions, a scene graph derived from the LOKI dataset is constructed that includes nodes including agent trajectory information, agent intent information, and goal information of the heterogenous traffic agents located within the surrounding environment of the ego agent, and nodes denoting road entrance and road exit information which provide the heterogeneous traffic agents with map topology information pertaining to the surrounding environment, and decoding and predicting future trajectories includes a decoder being configured to access the LOKI dataset to analyze the LOKI dataset in addition to the scene graph to determine the predicted intentions, goals, and past motion of all of the heterogenous traffic agents and a scene of the surrounding environment of the ego agent to predict the trajectories of each of the heterogeneous traffic agents that are located within the surrounding environment of the ego agent.

18. The non-transitory computer readable storage medium of claim 17, further including controlling at least one system of the ego agent to operate the ego agent within the surrounding environment of the ego agent based on the predicted future trajectories associated with each of the heterogeneous traffic agents.

* * * * *